F. BAKER, Jr.
PROCESS OF REMOVING COCOANUT SHELLS.
APPLICATION FILED JUNE 29, 1918.

1,374,899. Patented Apr. 19, 1921.

Inventor:
Franklin Baker, jr
by his Attorneys,
Howson & Howson

UNITED STATES PATENT OFFICE.

FRANKLIN BAKER, JR., OF PHILADELPHIA, PENNSYLVANIA.

PROCESS OF REMOVING COCOANUT-SHELLS.

1,374,899.  Specification of Letters Patent.  Patented Apr. 19, 1921.

Application filed June 29, 1918. Serial No. 242,513.

*To all whom it may concern:*

Be it known that I, FRANKLIN BAKER, Jr., a citizen of the United States, residing in Philadelphia, Pennsylvania, have invented an Improved Process of Removing Cocoanut-Shells, of which the following is a specification.

My invention relates to the art of removing the shells from the meat or kernel of cocoanuts; and the object of my invention is to provide a method or process of removing such shells which involves the application of means for making a continuous cut in the same; employing any suitable form of cutting tool and any suitable or available means for operating the same with respect to the nut whereby such cut will follow a helical or substantially helical path so that the shell, instead of having a great number of sections to be removed piecemeal, will have, at the most, only two sections; the tendency of which, after the continuous cut is completed, will be to spring away from the meat or kernel of the nut.

In carrying out my invention, the cutting member or tool may move with respect to the nut, or the nut may be moved with respect to the cutting tool; the tool may occupy a relatively fixed position of action or it may move around the nut. In fact, any arrangement of means whereby a continuous helical cut is made in the shell of a cocoanut or similar vegetable product having an outer shell or pericarp to be removed, I deem within the scope of my invention.

Figure 1:
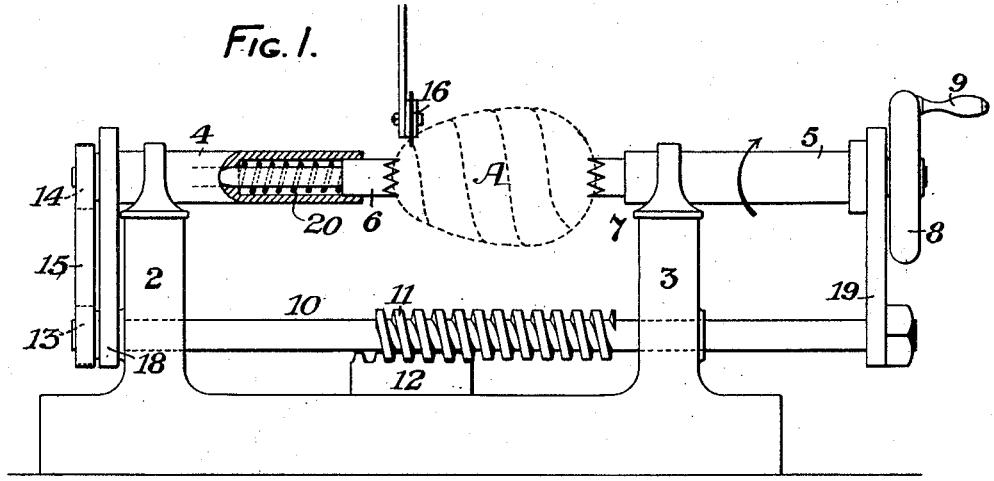
Figure 2:
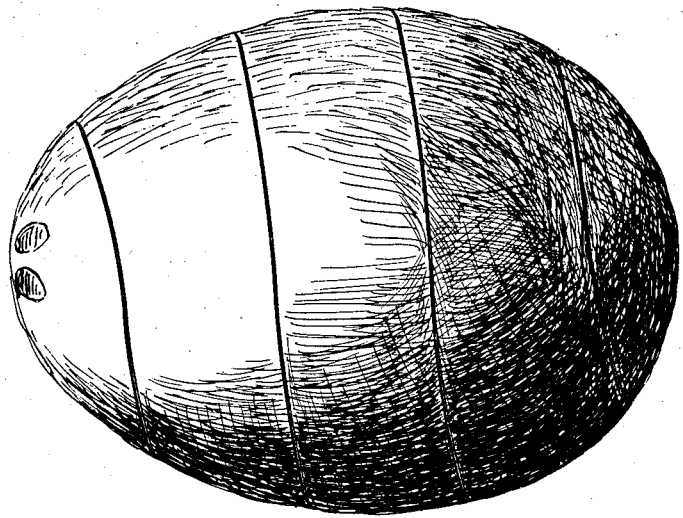

These and other features of my invention are more fully described hereinafter, reference being had to the accompanying drawings, in which:

Figure 1, is a diagrammatic view of one form of apparatus which may be employed in carrying out my invention, and Fig. 2, is a view of a cocoanut showing the shell thereof cut or grooved in a helical path.

It is more or less common to remove the shells of cocoanuts by sawing kerfs in such shells or sawing entirely through the shells, and then breaking away the sections between the cuts or kerfs thus made. This method, however, is more or less objectionable since the sections so produced usually have to be picked off one by one, and this operation requires quite a number of cuts around the shell, both across the shorter axis as well as the longer axis of the nut.

In carrying out my invention, I propose to make a continuous helical cut through the shell wall, as indicated more particularly in Fig. 2, and when this is done the shell, or sections thereof, will tend to spring away from the kernel of the nut; making its removal comparatively easy.

While many forms of devices may be designed to effect this result, I have shown more or less diagrammatically in Fig. 1, a form of apparatus which may be employed in carrying the process forming the subject of my invention into effect. In this structure, which is for illustrative purposes only, 1 may represent a suitable frame, having bearing posts 2 and 3, receiving arbors 4 and 5, having end jaws 6 and 7 between which a cocoanut A may be clamped. One of the arbors, that indicated at 5 for instance, may carry a hand wheel 8, with a crank 9 whereby it may be turned to rotate the nut.

The arbors are adapted to slide in the posts 2 and 3 of the frame, and motion to move the same longitudinally of the frame may be provided by a countershaft 10 having a threaded portion 11 adapted to the teeth of a rack 12 carried by the frame. The shaft 10 may be driven by wheels 13 and 14 and belt 15, from the arbor 4 so that by turning the arbor 5 by the crank 9, longitudinal movement, in addition to rotative movement, will be imparted to the cocoanut held between the jaws carried by said arbors and said cocoanut will be carried into operative engagement with a suitable saw 16, or any other form of cutter suitable for the purpose. The saw or cutter employed may be arranged to cut at right angles to the axis of rotation of the nut, or it may be mounted upon a suitable arbor and so carried by a supporting arm that it may swing to follow the arched surface of the nut and cut substantially at right angles to the plane of that portion of the shell with which it is in direct engagement. In either instance the saw or cutter may occupy a relatively fixed position for its cutting action but capable of properly engaging the shell of the cocoanut to cut through the wall of the same in a helical or substantially helical path, which is preferably continuous from end to end of the shell.

When the nut-carrying arbors 4 and 5 have been moved in one direction to traverse a nut past the relatively fixed saw or cutter, when such arrangement of mechanism is employed, rotation of such arbors may be reversed and another nut may be traversed in an opposite direction past the saw or cutter, so that as the arbors of the machine are moved back and forth a nut may be cut each time. In lieu of this, some form of quick return may be given the arbors so that movement of the nut in engagement with a tool to effect cutting of the shell may be in the same direction at all times.

The arbors 4 and 5 are preferably braced with relation to the shaft 10 by means of connecting bars 18 and 19 so that their movement is positive and follows the movement of the shaft. The jaws 6 and 7 carried by the arbors may be provided with springs 20 so that nuts of varying size may be properly engaged and held by the same for the cutting action.

By mounting the saw or cutter in a relatively fixed position of action, and then rotating and simultaneously imparting longitudinal movement to the nut past said saw or cutter, a helical cut will be formed in the shell, continuous from end to end of the latter, and which will so separate the shell from the kernel or meat of the nut as to cause such shell to spring away from the same. It will be understood, of course, that the cutter may be arranged to move around a cocoanut held in a substantially fixed position to accomplish the same result, and such arrangement or method of procedure is within the scope of my invention. It will also be understood that the cocoanut may be arranged to rotate in a fixed plane, with a cutting implement arranged to move lengthwise of the same and effect a cut through the wall of the shell in a helical path.

While I have referred to and have disclosed means for making a single helical cut in the wall of the shell continuous from end to end of the same, it will be understood that this cut may be shorter, if desired, and that means may be employed to effect a plurality of cuts simultaneously, or successively; all of which is deemed to be within the scope of my invention.

I claim:

1. The process of shelling a nut having the form of an ovoid or spheroid, which comprises supporting said nut at its polar ends, bringing a cutting tool into engagement with the shell of such nut at an angle to its polar axis, and imparting movements to the nut and the tool relatively to each other whereby a cut is made in the shell in a substantially helical path, said movements including (1) relative bodily movement between nut and tool to insure traverse of the tool over the length of the nut between supports; (2) relative movement of rotation, to cause the tool to travel relatively around the circumference of the nut between its poles; and (3) relative bodily movement between nut and tool to insure continued engagement of tool and nut despite the varying circumferential dimensions of the nut between its poles.

2. The process of shelling a nut having the form of an ovoid or spheroid, which comprises supporting said nut at its polar ends, bringing a cutting tool into engagement with the shell of the nut, and imparting longitudinal and rotative movements to said nut and tool relatively to each other whereby a continuous cut is made in the shell of the nut from end to end thereof.

3. The process of shelling a nut having the form of an ovoid or spheroid, which comprises supporting said nut at its polar ends, bringing a cutting tool into engagement with the shell of the nut, and imparting longitudinal and rotative movements to said nut and tool relatively to each other whereby a cut is made in the shell in a substantially helical path and extending from end to end of the nut.

FRANKLIN BAKER, Jr.